(12) United States Patent
 Markevitch

(10) Patent No.: US 8,112,577 B2
(45) Date of Patent: Feb. 7, 2012

(54) CONCURRENTLY COMMUNICATING REFRESH AND READ/WRITE COMMANDS WITH A MEMORY DEVICE

(75) Inventor: James A. Markevitch, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 533 days.

(21) Appl. No.: 11/973,492

(22) Filed: Oct. 8, 2007

(65) Prior Publication Data
US 2009/0094412 A1   Apr. 9, 2009

(51) Int. Cl.
 *G06F 13/00*   (2006.01)
(52) U.S. Cl. ......... 711/106; 365/222; 711/167; 711/168
(58) Field of Classification Search .................. 365/222; 711/106, 167, 168
 See application file for complete search history.

(56) References Cited

U.S. PATENT DOCUMENTS

| 5,335,201 | A | 8/1994 | Walther et al. |
| 6,667,927 | B2 | 12/2003 | Jones, Jr. |
| 6,885,603 | B2 | 4/2005 | Lee |
| 6,999,368 | B2 | 2/2006 | Fujimoto et al. |
| 7,117,299 | B2 * | 10/2006 | Ryan .............................. 711/106 |
| 7,460,426 | B2 | 12/2008 | Sadakata |
| 2002/0078316 | A1 * | 6/2002 | Nakamura .................... 711/167 |
| 2008/0285370 | A1 * | 11/2008 | Okuyama ..................... 365/222 |

OTHER PUBLICATIONS

"Various Methods of DRAM Refresh," TN-04-30, DT30.p. 65, Feb. 1999, Micron Technology, Inc., pp. 1-4.

* cited by examiner

*Primary Examiner* — Jae Yu
(74) *Attorney, Agent, or Firm* — The Law Office of Kirk D. Williams

(57) ABSTRACT

Disclosed are, inter alia, methods, apparatus, computer-readable media, mechanisms, and means for communicating with a memory device, such as by a memory controller, a refresh command at least partially overlapping in time with a read and/or write command. The refresh command typically specifies a group of locations (e.g., a bank) for being at least partially refreshed.

31 Claims, 5 Drawing Sheets

CONCURRENTLY COMMUNICATING REFRESH AND READ/WRITE COMMANDS WITH A MEMORY DEVICE

TECHNICAL FIELD

The present disclosure relates generally to memory devices, such as those used in communications and computer systems.

BACKGROUND

The communications and computer industries are rapidly changing to adjust to emerging technologies and ever increasing customer demand for systems with increased performance. Note, nothing described or referenced in this document is admitted as prior art to this application unless explicitly so stated.

DRAM (Dynamic Random Access Memory) and some other types of memory chips require that internal memory cells be "refreshed" periodically to prevent loss of stored data. These "refresh cycles" consume what would otherwise be useful bandwidth to the memory itself, and are typically a major issue in designing a memory chip as each used memory cell must be refreshed within a certain small amount of time or its data will be lost.

DRAM devices are typically internally composed of "banks" of memory that behave somewhat independently. Generally, a bank can be in one of four states: idle, performing a read operation, performing a write operation, or performing a refresh operation. It is important for system chips to "schedule" a sequence in which banks are read, written, or refreshed, such that a particular memory bank is not in a refresh cycle when it is desired to be read from, or written to, resulting in delay. During a command cycle, a DRAM device receives one command (e.g., refresh command, write command, read command, or NOP/idle).

Commonly, refresh cycles are initiated by system devices communicating with the DRAM devices over the communication interface between the system device and the DRAM device, by specifying a bank to refresh, and control logic within the memory chip refreshes a next set of one or more memory cells automatically. Therefore, by supplying successive refresh commands for a particular bank (typically interspersed with refresh commands for other banks, NOP, read and/or write commands), the memory locations in the particular bank are sequenced through and refreshed.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Figure 1A:
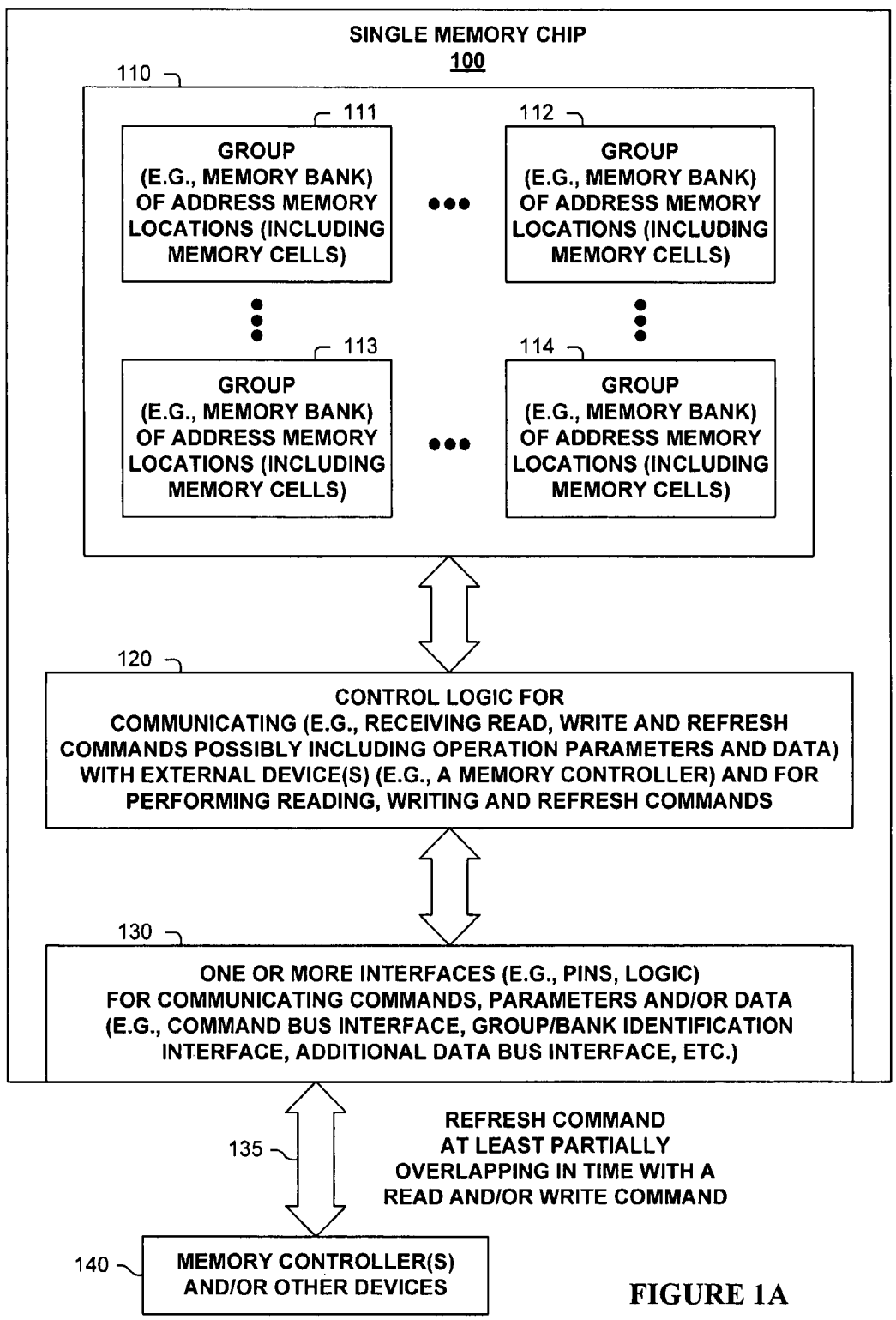
FIG. 1A illustrates a block diagram of one embodiment.

Disclosed are, inter alia, methods, apparatus, computer-readable media, mechanisms, and means for communicating with a memory device a refresh command at least partially overlapping in time with a read and/or write command.

2. Description

Embodiments described herein include various elements and limitations, with no one element or limitation contemplated as being a critical element or limitation. Each of the claims individually recites an aspect of the invention in its entirety. The embodiments described hereinafter embody various aspects and configurations within the scope and spirit of the invention, with the figures illustrating exemplary and non-limiting configurations. Note, the term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. Additionally, the term "or" is used herein to identify a selection of one or more, including all, of the conjunctive items; and, the transitional term "comprising," which is synonymous with "including," "containing," or "characterized by," is inclusive or open-ended and does not exclude additional, unrecited elements or method steps.

Disclosed are, inter alia, methods, apparatus, computer-readable media, mechanisms, and means for communicating with a memory device a refresh command at least partially overlapping in time with a read and/or write command, with the refresh command typically specifying a group of memory locations (e.g., a bank) for being at least partially refreshed. This, for example, typically allows the initiation of a refresh operation in bank different than that required for the received read or write command. Also, this concurrent signaling of a refresh command with a read or write command reduces the bandwidth requirement for the memory device's communication with external devices, and thus, helps to alleviate a problem which memory developers are solving by increasing the rate at which the banks can be refreshed.

Note, although portions of the description herein may refer to a memory device "receiving" a refresh command at least partially overlapping in time with a read and/or write command; it is understood that this description also inherently describes the operation(s) of one or more external devices (e.g., memory controller(s), other device(s)) transmitting a refresh command at least partially overlapping in time with a read and/or write command.

One embodiment includes an apparatus for storing information including groups of addressable memory locations, with each memory location being configured to be read from in response to a read command, and written to in response to a corresponding write command. Each group of addressable memory locations is also selectable for causing one or more memory cells within the group to be refreshed. The apparatus also includes one or more interfaces (e.g., pins and/or circuitry possibly with interface control logic) for receiving an operation code and operation parameters of commands to be performed and for receiving data, with these commands including: a read command, a write command, and a refresh command. The apparatus also includes control logic configured: to read from one or more memory locations in response to a received read command specifying a read operation code and the one or more memory locations, to write received data to one or more memory locations in response to a received write command specifying a write operation code and the one or more memory locations, and to refresh one or more memory cells in one or more but less than all of the groups of addressable memory locations in response to a received refresh command specifying a refresh operation code and the one or more but less than all of the plurality of groups of addressable memory locations. The apparatus is configured to receive the refresh command at least partially overlapping in time with receiving a read or write command.

In one embodiment, the one or more interfaces include: a command bus interface for receiving operation codes of the commands, and one or more additional busses configured for receiving operation parameters of the commands and for communicating data. In one embodiment, the one or more interfaces include: a command bus interface for said receiving operation codes of the commands, and the specification of one or more but less than all of the plurality of groups of addressable memory locations; and one or more additional busses configured for receiving operation parameters of the read and write commands and for communicating data. In one embodiment, the one or more interfaces include: a command bus interface for receiving operation codes of the commands, a group identification interface for identifying a single group of the groups of addressable memory locations for the commands, and one or more additional busses configured for receiving operation parameters of the read and write commands and for communicating data. In one embodiment, the apparatus is a single memory chip including a plurality of pins for communicating information, and the refresh command (including the refresh operation code and the identification of one or more but less than all of the plurality of groups of addressable memory locations) is received on a single pin of the plurality of pins.

In one embodiment, the apparatus is configured to receive the refresh command at least partially overlapping in time with receiving a read command. In one embodiment, the apparatus is configured to receive the refresh command at least partially overlapping in time with receiving a write command. In one embodiment, the apparatus is configured to receive the refresh command at least partially overlapping in time with receiving a read command and is configured to receive the refresh command at least partially overlapping in time with receiving a write command. In one embodiment, receiving the refresh command at least partially overlapping in time with receiving a read or write command includes receiving the refresh operation code at least partially overlapping in time with the read operation code of the read command or the write operation code of the write command. In one embodiment, receiving the refresh command at least partially overlapping in time with receiving a read or write command includes receiving the start of the refresh command and the start of the read or write command at the same time.

One embodiment includes a memory controller configured to send the refresh command overlapping in time with a read or write command over the one or more interfaces. In one embodiment, the received refresh command specifies a single group of the groups of addressable memory locations. In one embodiment, each of the groups of addressable memory locations corresponds to a different memory bank.

In one embodiment, the apparatus is a single memory chip. In one embodiment, the single memory chip is not multi-ported.

One embodiment includes an apparatus for storing information, comprising: means for storing information in a plurality of groups of addressable memory locations; means for reading from one or more memory locations in the plurality of groups of addressable memory locations in response to a received read command; means for writing to one or more memory locations in the plurality of groups of addressable memory locations in response to a received write command; means for refreshing one or more memory cells in the plurality of groups of addressable memory locations in response to a received refresh command; and means for receiving the refresh command at least partially overlapping in time with receiving the received read or write command.

In one embodiment, means for receiving the refresh command at least partially overlapping in time with receiving the received read or write command includes both means for receiving the refresh command at least partially overlapping in time with receiving the received command and means for receiving the refresh command at least partially overlapping in time with receiving the received write command. In one embodiment, means for receiving the refresh command at least partially overlapping in time with receiving a read or write command includes means for receiving the start of the refresh command and the start of the read or write command at the same time.

One embodiment includes a method performed by a single memory chip, the single memory chip including multiple groups of addressable memory locations; the single memory chip being configured to read information in response to receiving a read command specifying one or more memory locations; the single memory chip being configured to write data in response to receiving said data and a write command specifying said one or more memory locations; and the single memory chip being configured to refresh one or more memory cells in one or more but less than all of the groups of addressable memory locations in response to a received refresh command specifying the one or more but less than all of the plurality of groups of addressable memory locations. One embodiment includes: receiving the refresh command at least partially overlapping in time with receiving the read or write command; and in response to the operation of receiving said refresh command and the received read or write command at least partially overlapping in time, performing the refresh command and the received read or write command.

In one embodiment, the operation of receiving the refresh command at least partially overlapping in time with receiving the read or write command, receives the read command but not the write command. In one embodiment, the operation of receiving the refresh command at least partially overlapping in time with receiving the read or write command, receives the write command but not the read command. In one embodiment, the operation of receiving the refresh command at least partially overlapping in time with receiving the read or write command includes receiving a refresh operation code at least partially overlapping in time with a read operation code of the read command or a write operation code of the write command. In one embodiment, the operation of receiving the refresh command at least partially overlapping in time with receiving the read or write command includes receiving the start of the refresh command and the start of the read or write command at the same time. In one embodiment, each of the groups of addressable memory locations corresponds to a different memory bank within the single memory chip. In one embodiment, the single memory chip is not multi-ported.

One embodiment is performed by a memory controller for use in instructing a memory device configured to perform read operations, write operations, and refresh operations. One embodiment is configured to perform operations including: sending to the memory device: data, and at least partially overlapping in time both a write command specifying one or more addresses and a refresh command specifying a memory bank to refresh; and sending to the memory device at least partially overlapping in time: both a read command specifying one or more addresses and a refresh command specifying a memory bank to refresh.

Turning expressly to the figures, FIG. 1A illustrates an apparatus 100, which, in one embodiment, corresponds to a single memory chip 100. In one embodiment, apparatus 100 is one single-port memory chip.

As shown, apparatus 100, includes multiple groups 110 of individually selectable groups (e.g., banks or other sets) 111-114 of addressable memory locations, with each group including one or more memory cells that must be periodically refreshed. As shown, single memory chip 100 also includes control logic 120 and one or more interfaces 130. Control logic 120 is used to communicate with one or more external devices (e.g., memory controller(s) and/or other device(s)) commands (e.g., read, write, refresh) and their operational parameters (e.g., addresses, bank identification) and/or data (e.g., for writing to a memory location), as well as to perform these commands. Typically, a refresh command specifies one or more groups 111-114 of addressable memory locations for which to refresh, and the control logic refreshes one or more memory cells of one or more addressable memory locations within the specified or more groups 111-114. The control logic typically maintains state information for sequencing through each bank based on a sequence of refresh commands for said bank. One or more interfaces 130 (e.g., pins, interface circuitry and/or other logic) is used to communicate with one or more external devices 140 (e.g., memory controller(s) and/or other device(s)). As illustrated by designation number 135, single memory chip 100 is configured to receive a refresh command at least partially overlapping in time with a read and/or write command, and one or more external devices 140 is/are configured to transmit a refresh command at least partially overlapping in time with a read and/or write command.

Figure 1B:
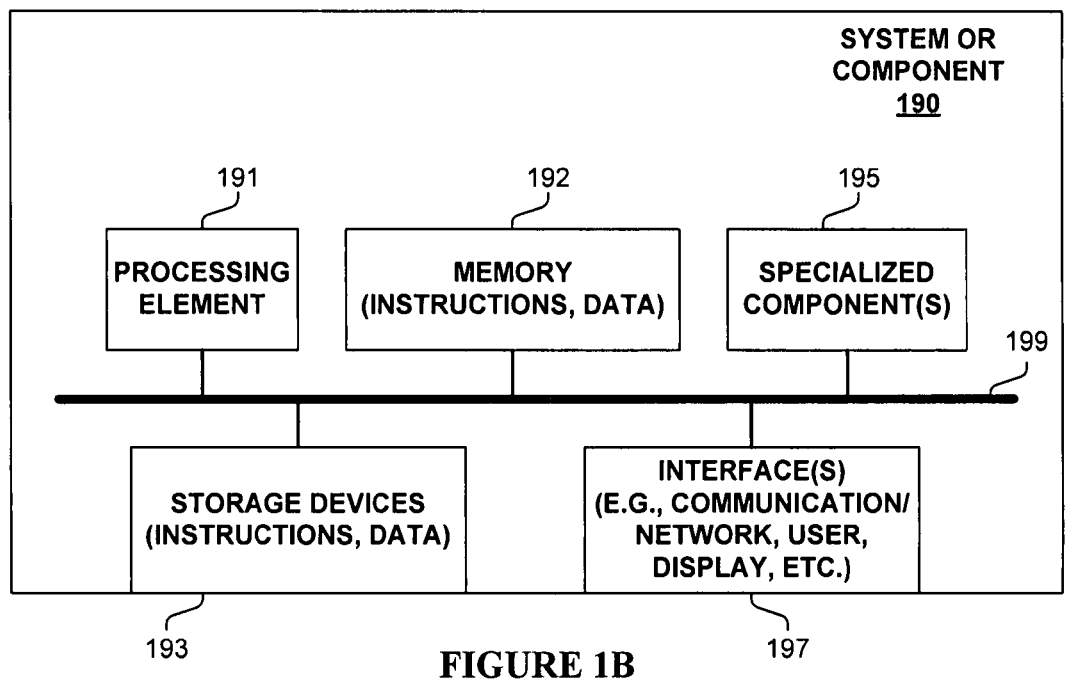
FIG. 1B illustrates an example system or component used in one embodiment.

FIG. 1B illustrates an example system or component (190) used in one embodiment that allows for a memory device to receive a refresh command at least partially overlapping in time with a read and/or write command. One or more system or components (190) may be used in one embodiment one or more times, such as for, but is not limited to, control logic, a memory controller or other external device, or even interface circuitry. In one embodiment, system or component 190 performs one or more processes (or portions thereof) corresponding to one of the flow diagrams illustrated or otherwise described herein.

In one embodiment, system or component 190 includes a processing element 191, memory 192, storage devices 193, specialized components 195 and interfaces 197 for communicating information, which are typically communicatively coupled via one or more communications mechanisms 199, with the communications paths typically tailored to meet the needs of the application.

Various embodiments of component 190 may include more or less elements. The operation of component 190 is typically controlled by processing element 191 using memory 192 and storage devices 193 to perform one or more tasks or processes. Memory 192 is one type of computer-readable medium, and typically comprises random access memory (RAM), read only memory (ROM), flash memory, integrated circuits, and/or other memory components. Memory 192 typically stores computer-executable instructions to be executed by processing element 191 and/or data which is manipulated by processing element 191 for implementing functionality in accordance with an embodiment. Storage devices 193 are another type of computer-readable medium, and typically comprise solid state storage media, disk drives, diskettes, networked services, tape drives, and other storage devices. Storage devices 193 typically store computer-executable instructions to be executed by processing element 191 and/or data which is manipulated by processing element 191 for implementing functionality in accordance with an embodiment.

Figure 2A:
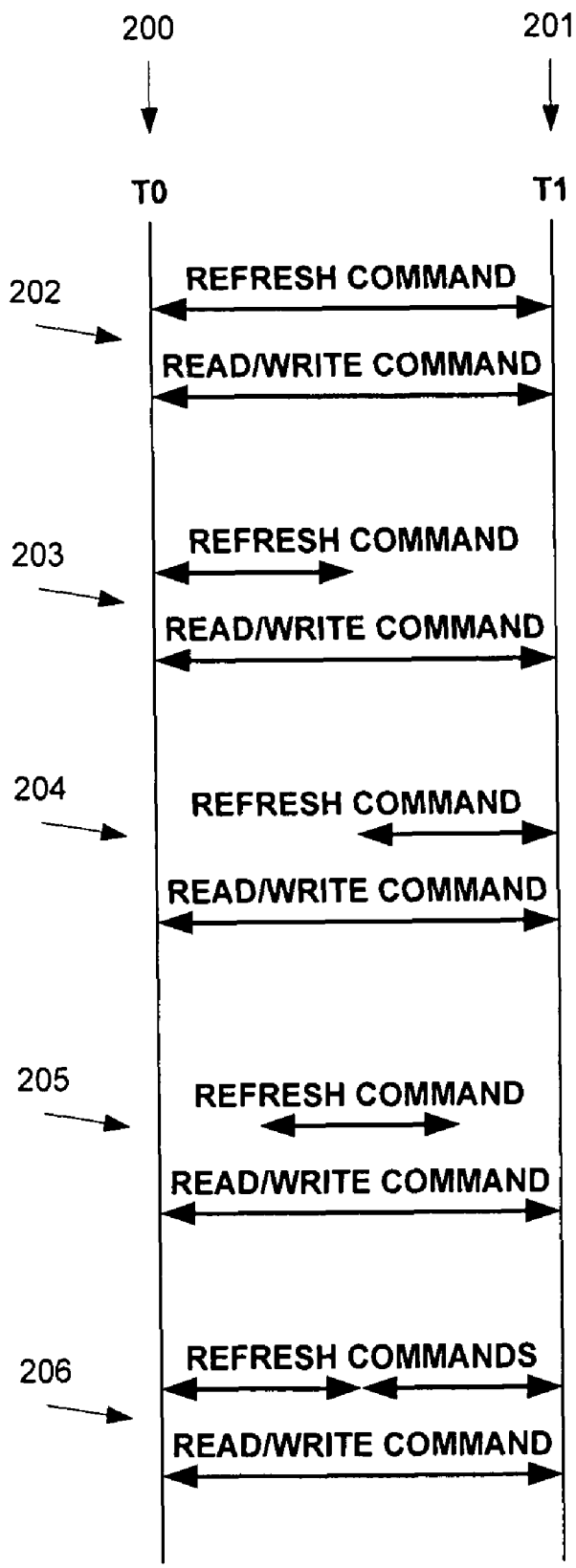
FIG. 2A illustrates exemplary overlapping refresh and read/write commands used in several of an unlimited number of embodiments.

FIG. 2A illustrates exemplary overlapping refresh and read/write commands used in several of an unlimited number of embodiments. Shown are a time zero (T0) 200 and a later time one (T1) 201. There are an extensible number of ways in which a refresh command can at least partially overlapping in time with a read and/or write command, with FIG. 2A illustrating five examples. Of course, in one embodiment, a refresh command begins before and/or ends after receiving/transmitting a read and/or write command.

Example 202 illustrates receiving by the memory device (and sending from one or more external devices) a refresh command at least partially overlapping in time with a read and/or write command, with the commands occurring over the entire T0-T1 period.

Examples 203, 204 and 205 illustrates receiving by the memory device (and sending from one or more external devices) a refresh command at least partially overlapping in time with a read and/or write command, with the refresh commands occurring at different times during the T0-T1 period.

Example 206 illustrates receiving by the memory device (and sending from one or more external devices) multiple refresh commands at least partially overlapping in time with a read and/or write command.

Therefore, examples 202, 203 and 206 illustrate three of an extensible number of configurations where the start of a refresh command and the start of a read or write command are received (or sent from a memory controller) at the same time.

Figure 2B:
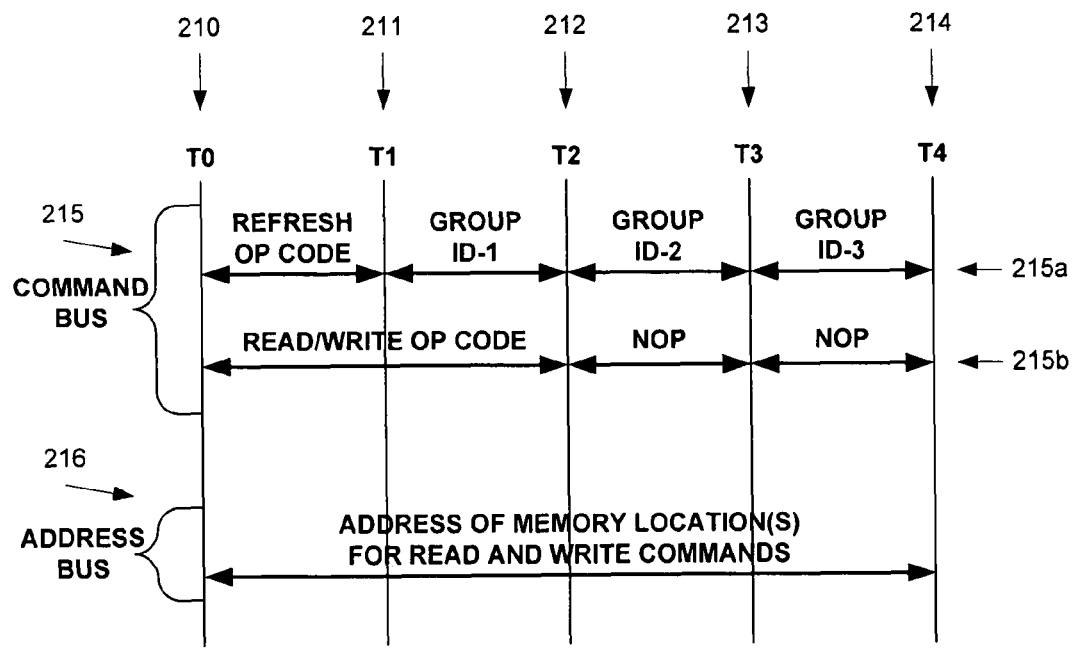
FIG. 2B illustrates the communicating of commands to a memory device as performed in one embodiment.

FIG. 2B illustrates the communicating of commands (e.g., operation codes and operational parameters) to a memory device from a memory controller as performed in one embodiment. Shown are a time zero (T0) 210, time one (T1) 211, time two (T2) 212, time three (T3) 213, and time four (T4) 214. As shown by reference number 215, over a command bus: a refresh command (215a) and a read or write command operation code (215b) are received. In one embodiment, the refresh command (215a) includes a refresh operation code and three group identification bits, which allows for the specification of up to eight different groups (e.g. banks) of addressable memory locations or up to eight different sets of groups of addressable memory locations. In one embodiment, this refresh command (215a) is received on a single pin, such as on a single memory device. In one embodiment, group ID's 1-3 identify a single group/bank on which the received refresh command is to be performed. Shown also is the receipt of the read or write command, which includes the read or write operation code (215b) being received over the command bus (215), and the address (e.g., group/bank, memory location within the group/bank) being received over the address bus (216). In one embodiment, the read or write operation code (215b) is communicated in less than the number of time periods used to communicate the address; and in which case, one or more NOP operation codes may be used, such as in the manner shown in FIG. 2B.

Note, the data associated with, but not part of the definition of a write command, is typically received by the memory device from the memory controller at a later time (not shown in FIG. 2B); and the data associated with, but not part of the definition of a read command, is typically sent by the memory device and received by the memory controller at a later time (not shown in FIG. 2B).

Figure 2C:
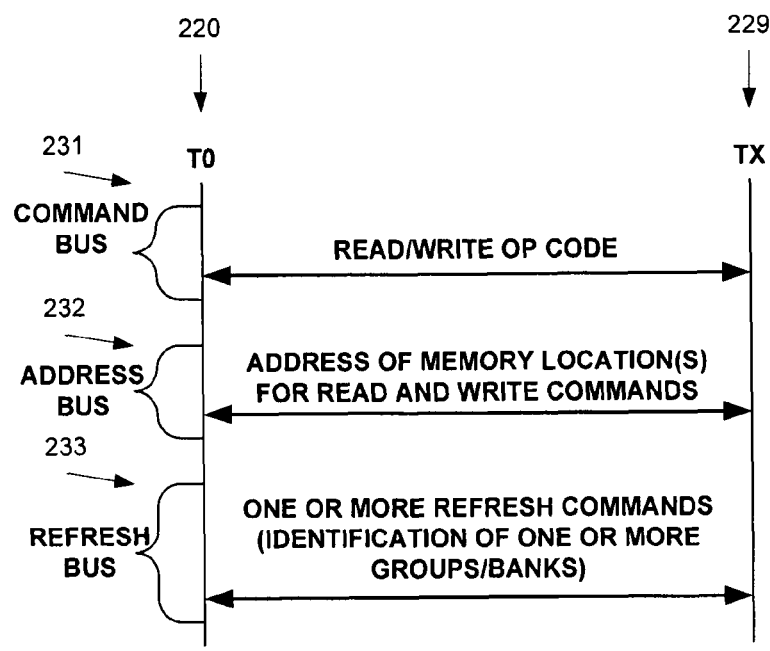
FIG. 2C illustrates the communicating of commands to a memory device as performed in one embodiment.

FIG. 2C illustrates the communicating of commands to a memory device from a memory controller as performed in one embodiment. Shown are a time zero (T0) 220 and some later time TX 229. One embodiment uses a refresh bus (233) in addition to a command bus (231). The one or more refresh commands each identify one or more groups or banks to be refreshed and are received over a refresh bus (233). In one embodiment, the refresh command includes a refresh operation code and the identification of one or more groups or banks to be refreshed. In one embodiment, the use of refresh bus 233 provides an inherent refresh operation code so it does not need to be specified, and therefore, the refresh command simply provides the identification of one or more groups or banks to be refreshed. Read and write commands are received at least partially overlapping in time with a refresh command as shown, with the read or write operation code being received over command bus (231), and the address (e.g., group/bank, memory location within the group/bank) being received over the address bus (232). The data associated with the write or read command is not shown, as this is not part of the definition of the write or read command as used herein.

Figure 3A:
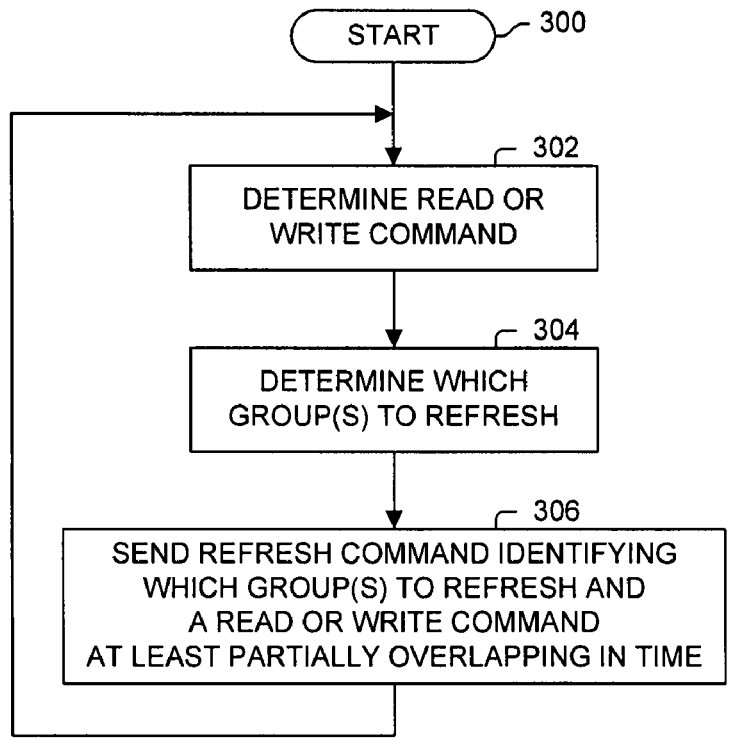
FIG. 3A illustrates a process used in one embodiment by one or more external devices (e.g., a memory controller)

FIG. 3A illustrates a process used in one embodiment by one or more external devices (e.g., a memory controller and/or another device). Processing begins with process block 300. In process block 302, a determination of a read or write command to be performed is made. In process block 304, a determination of which group(s) of addressable memory locations to initiate a refresh operation, typically such that a set of read and/or write operations will not be delayed by the refresh operation. In process block 306, the refresh command identifying which group or groups to refresh and the read or write command are sent at least partially overlapping in time to the memory device (e.g., one, single-ported memory chip). Processing returns to process block 302 to perform more operations.

Figure 3B:
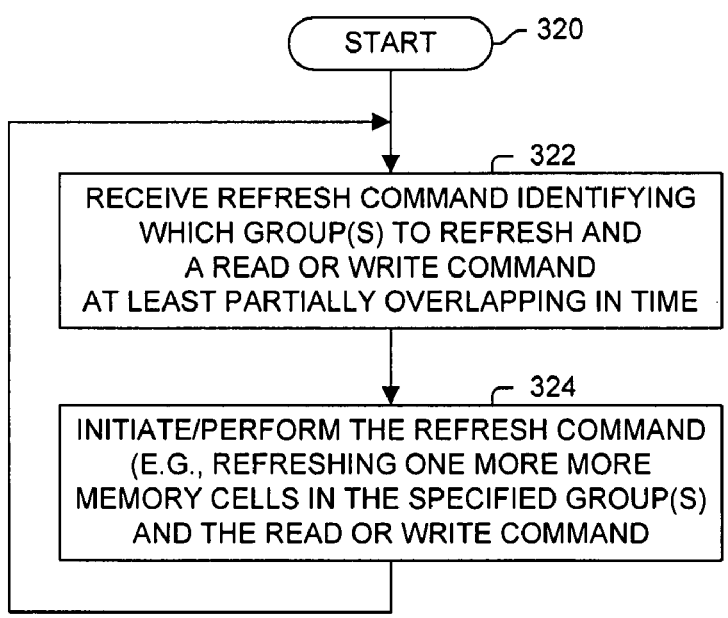
FIG. 3B illustrates a process used in one embodiment by a memory device (e.g., a single memory chip).

FIG. 3B illustrates a process used in one embodiment by a memory device (e.g., a single memory chip). Processing begins with process block 320. In process block 322, a refresh command identifying which group or groups to refresh and the read or write command are received at least partially overlapping in time by the memory device (e.g., one, single-ported memory chip). In process block 324, the refresh commands and read or write operations are initiated/performed. Processing returns to process block 322 to perform more operations.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus for storing information, comprising:
a plurality of groups of addressable memory locations, with each memory location of said addressable memory locations being configured to be read from in response to a read command corresponding to said memory location, and written to in response to a write command corresponding to said memory location; and with each group of the plurality of groups of addressable memory locations being selectable for causing one or more memory cells within said group to be refreshed;
one or more interfaces configured for receiving an operation code and operation parameters of a plurality of commands to be performed and for receiving data, with the plurality of commands including: said read command, said write command, and a refresh command;
control logic configured: to read from one or more memory locations in the plurality of groups of addressable memory locations in response to a received read command specifying a read operation code and said one or more memory locations, to write received data to one or more memory locations in the plurality of groups of addressable memory locations in response to a received write command specifying a write operation code and said one or more memory locations, and to refresh one or more memory cells in the plurality of groups of addressable memory locations in one or more but less than all of the plurality of groups of addressable memory locations in response to a received refresh command specifying a refresh operation code and said one or more but less than all of the plurality of groups of addressable memory locations;
wherein the apparatus is configured to receive the refresh command at least partially overlapping in time with receiving a read or write command.

2. The apparatus of claim 1, wherein said one or more interfaces include:
a command bus interface for said receiving operation codes of the plurality of commands, and
one or more additional busses configured for receiving operation parameters of the plurality of commands and for communicating data.

3. The apparatus of claim 1, wherein said one or more interfaces include:
a command bus interface for said receiving operation codes of the plurality of commands and said specification of one or more but less than all of the plurality of groups of addressable memory locations; and
one or more additional busses configured for receiving operation parameters of said read and write commands and for communicating data.

4. The apparatus of claim 1, wherein said one or more interfaces include:
a command bus interface for said receiving operation codes of the plurality of commands, a group identification interface for identifying a single group of the plurality of groups of addressable memory locations for said commands; and
one or more additional busses configured for receiving operation parameters of said read and write commands and for communicating data.

5. The apparatus of claim 1, wherein the apparatus is configured to receive the refresh command at least partially overlapping in time with receiving a read command.

6. The apparatus of claim 1, wherein the apparatus is configured to receive the refresh command at least partially overlapping in time with receiving a write command.

7. The apparatus of claim 1, wherein the apparatus is configured to receive the refresh command at least partially overlapping in time with receiving a read command; and
wherein the apparatus is configured to receive the refresh command at least partially overlapping in time with receiving a write command.

8. The apparatus of claim 1, including a memory controller configured to send the refresh command overlapping in time with a read or write command over said one or more interfaces.

9. The apparatus of claim 1, wherein the apparatus is a single memory chip including a plurality of pins for communicating information; and
wherein said received refresh command, specifying the refresh operation code and said one or more but less than all of the plurality of groups of addressable memory locations, is received on a single pin of the plurality of pins.

10. The apparatus of claim 1, wherein each of the plurality of groups of addressable memory locations corresponds to a different memory bank.

11. The apparatus of claim 1, wherein the apparatus is a single memory chip.

12. The apparatus of claim 11, wherein the single memory chip is not multi-ported.

13. The apparatus of claim 1, wherein said receiving the refresh command at least partially overlapping in time with receiving a read or write command includes receiving the refresh operation code at least partially overlapping in time with the read operation code of the read command or the write operation code of the write command.

14. The apparatus of claim 1, wherein said receiving the refresh command at least partially overlapping in time with receiving a read or write command includes receiving the start of the refresh command and the start of the read or write command at the same time.

15. A device for storing information, comprising:
means for storing information in a plurality of groups of addressable memory locations;
means for reading from one or more memory locations in the plurality of groups of addressable memory locations in response to a received read command;
means for writing to one or more memory locations in the plurality of groups of addressable memory locations in response to a received write command;
means for refreshing one or more memory cells in the plurality of groups of addressable memory locations in response to a received refresh command; and
means for receiving, from a source external to the device, the refresh command at least partially overlapping in time with receiving the received read or write command;
wherein said means for receiving the refresh command at least partially overlapping in time with receiving the received read or write command includes both means for receiving the refresh command at least partially overlapping in time with receiving the received command and means for receiving the refresh command at least partially overlapping in time with receiving the received write command.

16. The device of claim 15, wherein said means for receiving the refresh command at least partially overlapping in time with receiving a read or write command includes means for receiving the start of the refresh command and the start of the read or write command at the same time.

17. The device of claim 15, wherein the device is a single memory chip.

18. The device of claim 17, wherein the single memory chip is not multi-ported.

19. The device of claim 15, wherein the refresh command includes an identification of one or more selectable groups for the device to refresh.

20. The device of claim 15, wherein the device is a single memory chip.

21. A method, comprising:
receiving, by a single memory chip from a source external to the single memory chip, a refresh command at least partially overlapping in time with receiving a read or write command; and
in response to said receiving said refresh command and said received read or write command at least partially overlapping in time, the single memory chip performing said refresh command and said received read or write command;
wherein the single memory chip includes a plurality of groups of addressable memory locations; the single memory chip being configured to read information from one or more memory locations within the plurality of groups of addressable memory locations in response to receiving a read command specifying said one or more memory locations; the single memory chip being configured to write data to one or more memory locations within the plurality of groups of addressable memory locations in response to receiving said data and a write command specifying said one or more memory locations; and the single memory chip being configured to refresh one or more memory cells in one or more but less than all of the plurality of groups of addressable memory locations in response to receiving said refresh command specifying said one or more but less than all of the plurality of groups of addressable memory locations;
wherein said receiving said refresh command at least partially overlapping in time with receiving said read or write command includes receiving a refresh operation code at least partially overlapping in time with a read operation code of the read command or a write operation code of the write command.

22. The method of claim 21, said operation of receiving said refresh command at least partially overlapping in time with receiving said read or write command receives said read command but not said write command.

23. The method of claim 21, said operation of receiving said refresh command at least partially overlapping in time with receiving said read or write command receives said write command but not said read command.

24. The method of claim 21, wherein said receiving said refresh command at least partially overlapping in time with receiving said read or write command includes receiving the start of the refresh command and the start of the read or write command at the same time.

25. The method of claim 21, wherein each of the plurality of groups of addressable memory locations corresponds to a different memory bank within the single memory chip.

26. The method of claim 21, wherein the single memory chip is not multi-ported.

27. A method, comprising:
sending by a memory controller to a memory device that is external to the memory controller: (a) data, and (b) at least partially overlapping in time both: (1) a write command specifying a write operation code and one or more addresses for causing the memory device to store said data in one or more locations within the memory device corresponding to said one or more addresses, and (2) a refresh command specifying a refresh operation code and a memory bank to refresh for causing the memory device to refresh the memory bank within the memory device; and sending by the memory controller to the memory device at least partially overlapping in time both: (1) a read command specifying a read operation code and one or more addresses for causing the memory device to read information stored in one or more locations within the memory device corresponding to said one or more addresses, and (2) a refresh command specifying a refresh operation code and a particular memory bank to refresh for causing the memory device to refresh the particular memory bank within the memory device;

wherein the memory device is embodied in a chip physically different than the memory controller.

28. A method, comprising:

sending by an external device to a memory device that is external to the external device (a) data, and (b) at least partially overlapping in time both: (1) a write command specifying a write operation code and one or more addresses, and (2) a refresh command specifying a refresh operation code and one or more selectable groups for the memory device to refresh; and in response to receiving said sent data, the write command, and the refresh command: (1) writing, by the memory device, said data in one or more locations within the memory device corresponding to said one or more addresses in response to the write command; and (2) refreshing, by the memory device, said one or more selectable groups within the memory device in response to the refresh command;

wherein the memory device is embodied in a chip physically different than the external device.

29. A method, comprising:

sending, by an external device to a memory device that is external to the external device, at least partially overlapping in time both: (1) a read command specifying a read operation code and one or more addresses, and (2) a refresh command specifying a refresh operation code and one or more selectable groups for the memory device to refresh; and in response to receiving the read command, and the refresh command: (1) reading, by the memory device, data from one or more locations within the memory device corresponding to said one or more addresses; (2) communicating said read data to the external device; and (3) refreshing, by the memory device, said one or more selectable groups within the memory device in response to the refresh command;

wherein the memory device is embodied in a chip physically different than the external device.

30. A method, comprising:

receiving by a memory device from an external device that is external to the memory device: (a) data, and (b) at least partially overlapping in time both: (1) a write command specifying a write operation code and one or more addresses, and (2) a refresh command specifying a refresh operation code and one or more selectable groups for the memory device to refresh; and in response to receiving said sent data, the write command, and the refresh command: (1) storing, by the memory device, said data in one or more locations within the memory device corresponding to said one or more addresses in response to the write command; and (2) refreshing, by the memory device, said one or more selectable groups within the memory device in response to the refresh command;

wherein the memory device is embodied in a chip physically different than the external device.

31. A method, comprising:

receiving, by a memory device from an external device that is external to the memory device, at least partially overlapping in time both: (1) a read command specifying a read operation code and one or more addresses, and (2) a refresh command specifying a refresh operation code and one or more selectable groups for the memory device to refresh; and in response to receiving the read command, and the refresh command: (1) reading, by the memory device, data from one or more locations within the memory device corresponding to said one or more addresses; (2) communicating said read data to the external device; and (3) refreshing, by the memory device, said one or more selectable groups within the memory device in response to the refresh command;

wherein the memory device is embodied in a chip physically different than the external device.

* * * * *